Jan. 21, 1930.  H. C. KARCHER  1,744,551
AIRPLANE SHOCK ABSORBER
Filed Nov. 4, 1927
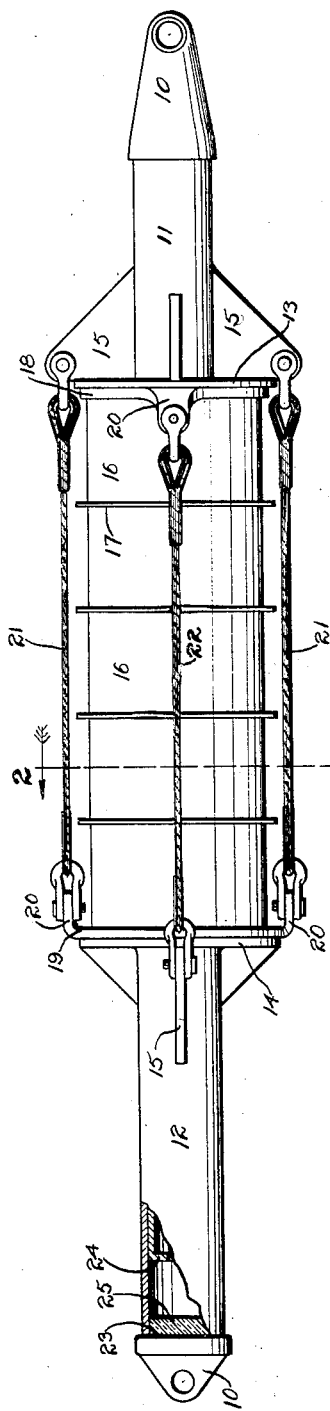
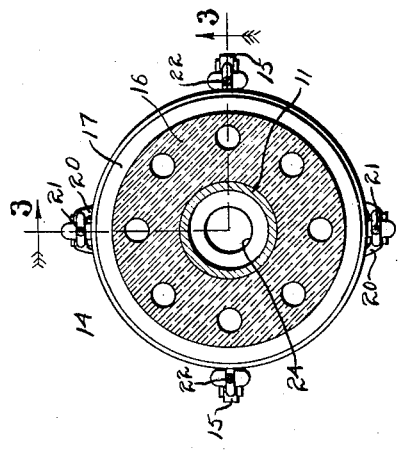
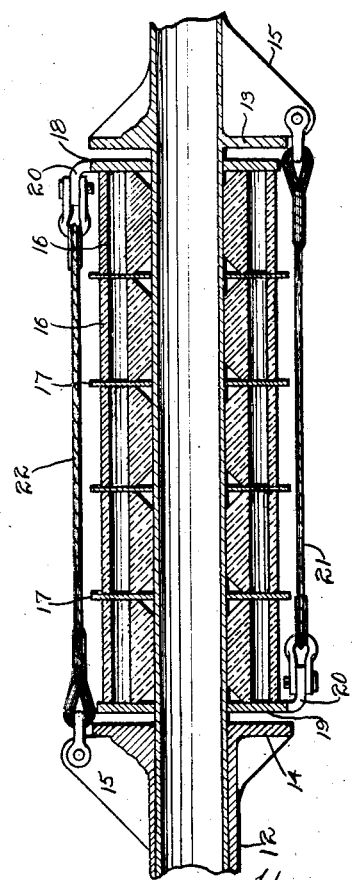
INVENTOR.
Harry C. Karcher.
BY C. R. Halbert.
E. L. Davis.
ATTORNEYS.

Patented Jan. 21, 1930

1,744,551

UNITED STATES PATENT OFFICE

HARRY C. KARCHER, OF DEARBORN, MICHIGAN, ASSIGNOR TO FORD MOTOR COMPANY, OF HIGHLAND PARK, MICHIGAN, A CORPORATION OF DELAWARE

AIRPLANE SHOCK ABSORBER

Application filed November 4, 1927. Serial No. 230,999.

The object of my invention is to provide an airplane shock absorber of simple, durable and inexpensive construction.

Still a further object of my invention is to provide an airplane shock absorber of the type adapted to be inserted in the middle of an airplane landing gear strut wherein a cushioning means is provided to cushion the shock of compression and to combine therewith mechanism whereby the reaction from this compression may also be cushioned.

Still a further object of my invention is to provide a compression shock absorber adapted to be inserted in a landing gear strut of an airplane which is so arranged that the same compression means which absorbs the landing shock, may also be utilized to stop the rebound and to cushion the shock of picking up the landing gear in case the airplane bounces off the ground.

With these and other objects in view my invention consists in the arrangement, combination, and construction of the various parts of my improved device, as described in the specification, claimed in the claims and illustrated in the accompanying drawings, in which:

Figure 1 shows an elevation of an airplane strut having my improved shock absorber device included therein.

Figure 2 shows a horizontal sectional view taken on the line 2—2 of Figure 1, and Figure 3 shows a vertical central sectional view taken on the line 3—3 of Figure 2.

Referring to the accompanying drawings I have used the reference numeral 10 to indicate generally the fittings at the top and bottom of an airplane strut having telescoping tubes 11 and 12 which are fixed to the fittings 10 and slide upon each other as is illustrated in Figure 3. Compression plates 13 and 14 are integrally united with tubular members 11 and 12 in position spaced from each other and vertical reinforcing webs 15 are extended radially from the tubular members 11 and 12 and integrally reunited with said tubular members to form reinforcement therefor.

A column of rubber discs 16 which are separted by metal discs 17 extend between the compression plates 13 and 14. It will be seen that due to the telescopic connection between the tubular members 11 and 12, then that any compression on the strut member will cause the compression plates 13 and 14 to place the discs 16 under compression to thereby cushion any compression shocks.

In case the discs 16 are placed under heavy compression due to the shock of a landing, it will be seen that the recoil thereof will tend to separate the tubular members 11 and 12. In connection with such shock absorbers it has been customary to provide a pin and slot connection or other limiting means, to limit this separation of the tubular members 11 and 12. This positive stop construction served to carry the weight of the landing gear when the plane was in the air and to lift the landing gear in case the plane bounced from the ground. It will be seen that such a positive stop is subject to injury due to sudden jerks thereon when the airplane makes several bounces in making a rough landing. In my improved device means are provided for cushioning this jerk when the landing wheels are picked by the plane and to cushion any movement of the tubular members 11 and 12 upon each other by placing compression on the discs 16 whether the struts 11 and 12 tend to move toward each other or away from each other.

In the form of device here illustrated, compression plates 18 and 19 are inserted in between the ends of the column of discs 16 and the adjacent compression plates 13 and 14. Each plate 18 and 19 has oppositely disposed ears 20 extending therefrom. The alternate webs 15 are extended beyond the compression plates 13 and 14. The extensions of the webs 15 adjacent to the upper compression plate 13 are connected by cables 21 with the lower compression disc 19 and the extended webs 15 adjacent to the lower compression plate 14 are connected by cables 22 with corresponding ears on the compression disc 18 of the disc 16. As these webs 15 are integral with the tubular members 11 and 12, it will be seen that the cables 21 connect the disc 19 with the tubular member 11 and the cables 22 connect the disc 18 with a tubular member 12 whereby separation of the tubular members 11 and 12 will place the cables 21 and 22 under tension to thereby draw the compression discs 18 and 19 toward each other thereby compressing the column of rubber disc 16. The manner in which this compression occurs is illustrated in Figure 3 where the parts are illustrated as being under compression due to separation of the tubular members 11 and 12. When the tension tending to pull the members 11 and 12 apart has been removed, the expansion of the discs 16 will return the parts to their normal position.

Means for limiting the movement of the members 11 and 12 toward each other may be provided if desired, comprising the shoulder 23 in the tubular member 12 and the flange 24 at the end of the tubular member 11. The meeting of these shoulders may be cushioned by the compressible gasket 25 if desired.

In the practical operation of my improved device, the parts are assembled as is illustrated in Figure 1. The cables 21 and 22 are of such length that they will be under slight tension when the airplane is at rest on the ground with a normal load thereon. In other words the parts are so arranged that the disc 16 will cushion movement of the tubular members 11 and 12 upon each other in either direction at all times. The strut here shown is of course designed to be installed as part of the landing gear of the plane and would extend between the fuselage or wing and the running gear.

Among the many advantages arising from the use of my improved shock absorber, it should first be pointed out that the device enables the airplane to be made lighter, as it cushions the shock of picking up the landing gear when the airplane leaves the ground, thereby making it possible to secure the landing gear to the airplane with parts of lighter weight. The strut members may also be correspondingly lighter. Of course the advantage may also be stated in the opposite way, namely that much greater strength is secured with substantially the same weight.

Still a further advantage results from the fact that movement of the fuselage away from the running gear is cushioned by my improved shock absorber construction whereby the shock absorber makes the airplane ride easier with consequently less strain on the various parts of the airplane. In other words I am enabled to largely increase the efficient strength of the airplane parts without materially increasing the weight.

Some changes may be made in the arrangement, combination, and construction of the various parts of my improved device without departing from the spirit of my invention, and it is my intention to cover by my claims such changes as may reasonably be included within the scope thereof.

I claim as my invention:

1. In a device of the character described, aligned members movable toward and from each other, a compressible cylinder, a compression plate and a compression disc at each end of said cylinder, and independent means for operatively connecting a compression plate and a compression disc with each of said first described members whereby movement of said first described members both toward and from each other may place said cylinder under compression.

2. In a device of the character described, tubular members telescopically mounted upon each other, compression plates fixed to said tubular members in position spaced from each other, a compression disc disposed adjacent to each of said plates, independent means for connecting each disc with the remote plate to limit positively the movement of the plates away from the discs and to permit movement of the discs toward the plates, and a compressible member between said discs.

3. In a device of the character described, tubular members telescopically connected together, a compression plate fixed to each tubular member in position spaced from the other compression plate, compression discs disposed adjacent to each compression plate, a compressible member extended between said compression discs, and flexible members extended between each disc and the remote plate whereby movement of said first described members both toward and from each other may place said compressible member under compression.

4. In a device of the character described, tubular members telescopically connected together, a compression plate fixed to each member in position spaced from the other compression plate, compression discs disposed adjacent to each compression plate, said discs having ears extended therefrom and said plate having ears extending therefrom, a compressible member extended between said compression discs, and flexible members having their ends fixed in said ears and arranged so that each compression plate is operatively connected by a plurality of flexible members with the remote compression disc whereby movement of said first described members both forward and from each other may place said compression member under compression.

5. In a device of the character described, members telescopically connected together, a compression plate on each of said members, a compression disc slidably mounted adjacent to each compression plate, a compressible member extended between said compression discs, and flexible members extended between each disc and the remote plate whereby movement of said first described members both toward and from each other may place said compressible member under compression.

HARRY C. KARCHER.